May 20, 1941.                H. J. MURPHY                 2,242,591
     KNOB AND THE LIKE INSTALLATIONS AND FASTENER MEMBERS FOR THE SAME
                        Original Filed July 8, 1937
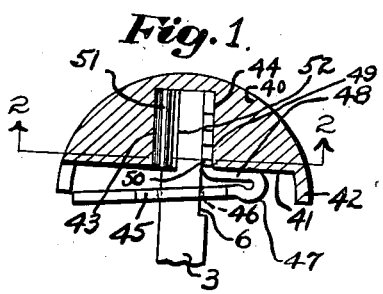
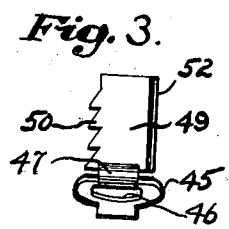
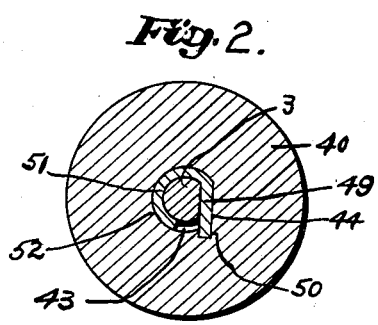
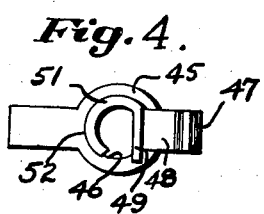
INVENTOR.
Howard J. Murphy.
BY Walter J. Jones
ATTORNEY.

Patented May 20, 1941

2,242,591

UNITED STATES PATENT OFFICE 2,242,591

KNOB AND THE LIKE INSTALLATIONS AND FASTENER MEMBERS FOR THE SAME

Howard J. Murphy, Greenwood, Mass., assignor to United-Carr Fastener Corporation, Cambridge, Mass., a corporation of Massachusetts Original application July 8, 1937, Serial No. 152,581, now Patent No. 2,128,730, dated August 30, 1938. Divided and this application February 18, 1938, Serial No. 191,234

1 Claim. (Cl. 287—53)

The present invention relates to fastener installations for removably attaching an operating member, as for example, a knob or the like, to a shaft, and aims generally to improve the fastener installations as well as the fastener member for the same.

Certain forms of the invention are illustrated in the accompanying drawing, wherein Fig. 1 is a section through the knob installation with one form of fastener member and shaft shown in full lines;

Fig. 2 is a sectional view taken on the line 2—2 of Fig. 1;

Fig. 3 is an end view of the fastener member; and

Fig. 4 is a top plan view of the fastener member shown in Fig. 3.

One of the objects of the invention is the provision of a simple and inexpensive fastener member adapted for quick and easy assembly with an operating member which may be any suitable article of manufacture, as for example, a rotatable knob, so as to enable a shaft to be detachably secured to the article.

A principal feature of my invention is embodied in the relative constructions of the articles of manufacture and the fastener members of the respective installations enabling the fastener members to be fixedly secured to the articles of manufacture in proper position for efficient operation in a manner requiring a minimum amount of time and labor.

For purposes of illustration I have chosen to combine my fastener members with knob members such as may be used on radio dial panels or automobile instrument panels, but it is understood that I do not wish to limit the use of my fastener members to articles of manufacture of the type illustrated and described because my fastener members are equally adaptable to use with other articles of manufacture as will be understood from inspection of the drawing and the description hereinafter set forth.

Referring to the installation illustrated in the drawing, the article of manufacture with which I have chosen to illustrate my invention is in the form of a knob member 40 having spring-plate means gripping a shaft 3 for attaching the shaft to the knob. The knob member 40, which I have chosen for purposes of illustrating my invention, has a body portion with an end face 41 at one end thereof. A peripheral flange 42 may extend from the end face 41 so as to aid in concealing the fastener member when the fastener is secured to the knob. The end face 41 has an opening 43 therein which has a flat side 44 for a purpose which will be described. The opening 43 preferably extends in right-angular relation to the end face 41 and is adapted to receive an attaching portion of the fastener member for securing the fastener to the knob and a shaft-supporting bearing adapted to snugly embrace a portion of the peripheral surface of the shaft 3.

The fastener member, which is clearly illustrated in Figs. 3 and 4 of the drawing, is preferably formed of one piece of sheet metal material. The fastener member has an inclined spring plate portion 45 which is provided with a flat sided aperture 46 for receiving an end of the shaft 3 whereby the plate 45, in expanded position, may grip the shaft by canting action. At one end of the plate 45 I have provided a loop portion 47 having an inwardly-bent portion 48 at its free end extending beneath one side of the plate 45. As a means for securing the fastener member to the knob 40, I have provided an attaching portion 49 at the free end of the inwardly-bent portion 48. The attaching portion 49 has an outer flat surface adapted to engage the flat side 44 of the aperture 43 of the knob member, as most clearly shown in Figs. 21 and 22. On one edge of the attaching portion 49 I have provided teeth 50 (Figs. 1 and 2) adapted to engage material of the body of the knob portion adjacent the opening 43 for preventing removal of the attaching portion after it has been once moved into affixed position. Integral with the opposite edge of the attaching portion 49 from that having the teeth I have provided a side portion 51 which is of bowed cross-section (Fig. 2) so as to provide a bearing-like portion 52 adapted to embrace snugly a portion of the peripheral surface of the shaft 3, as most clearly shown in Fig. 2. The bearing-like portion 52 provides additional support for the shaft member and aids in taking up any strain which the fastener member might undergo if the knob installation were used with apparatus such as an electric switch device in which it would be desirable to subject the knob to rotary pressure for turning the shaft.

In assembling my fastener member with an article of manufacture such as the knob 40, I move the attaching portion 49 and the bearing 52 into the opening 43 of the knob with the outer flat surface of the attaching portion adjacent the flat side 44 of the opening. Then pressure is exerted upon the fastener member to force the attaching portion into the opening until the inwardly-bent portion 48 of the fastener member abuts the end face 51 of the knob, as shown in Fig. 1. During passage of the attaching portion into the opening, the teeth 50 tend to dig into material of the knob adjacent the opening and engage with the material in a way to prevent withdrawal of the attaching portion. When the fastener member is permanently affixed with the knob member, as shown in Fig. 1, the plate portion 45 is in inclined relation to the end face 41 of the knob member and at the same time the aperture 46 of the plate 45 is disposed slightly out of alignment with the shaft-receiving opening defined by the inner surfaces of the attaching portion 49 and the bowed side portion 51. The shaft member 3 is now moved into the aperture 46 of the plate portion 45 with the flat side 6 of the shaft opposite the flat side of the aperture 46. As the shaft 3 is moved through the aperture 46 into the opening of the bearing 52, the pressure of the shaft causes the plate portion 45 to contract whereby the aperture 46 is brought into substantial alignment with the opening provided by the bearing 52 so as to permit the passage of the shaft into the bearing until the outermost free end of the shaft abuts the body of the knob closing the lower end thereof. After the shaft has been moved into this position the plate portion 45 expands whereby material of the plate portion adjacent the aperture 51 engages the shaft by a canting action to secure the shaft to the knob. The shaft may be easily and quickly released from the knob by passing a tool beneath the knob to press the ear 53 adjacent an end of the plate in the direction of the end face 41 thereby moving the aperture 46 into substantial alignment with the opening of the bearing 52 whereby the shaft may be readily detached.

Thus by my invention I have provided fastener installations, each of which comprises, in my preferred form, a preformed knob member of inexpensive construction and a simple fastener member capable of being quickly and easily secured to the knob member so as to provide an efficient means for detachably attaching a shaft to the knob.

In the claim I have referred to the knob member as an operating member and by that term I intend to include a member operated by the shaft as well as a member for operating the shaft.

The present application is a division of my copending application Serial No. 152,581, now Patent No. 2,128,730 issued August 30, 1938.

Although I have illustrated and described preferred embodiments of the invention, I do not wish to be limited thereby because the scope of the invention is best defined by the following claim.

I claim:

In combination with a shaft and an operating member on one end thereof, of a fastener for securing said member to said shaft, said fastener having a plate-like apertured portion surrounding and normally gripping the shaft as when biased with respect to a transverse plane through said shaft, and a split sleeve-like attaching portion surrounding one end of the shaft connected to and disposed at an obtuse angle to the shaft-gripping portion, and means tangentially of the bearing portion at one edge of the split sleeve extending into the material of the operating member for preventing relative rotation of said operating member and fastener.

HOWARD J. MURPHY.